(12) United States Patent
Henry et al.

(10) Patent No.: US 10,859,040 B2
(45) Date of Patent: *Dec. 8, 2020

(54) INTERNAL COMBUSTION ENGINE HAVING CATALYZED HEAT EXCHANGER FOR STEAM REFORMATION AND DELIVERY OF HYDROGEN TO A FUEL CELL

(71) Applicant: Southwest Research Institute, San Antonio, TX (US)

(72) Inventors: Cary A. Henry, Helotes, TX (US); Robert T. Henderson, San Antonio, TX (US); Graham T. Conway, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/242,120

(22) Filed: Jan. 8, 2019

(65) Prior Publication Data

US 2020/0217278 A1    Jul. 9, 2020

(51) Int. Cl.

| | |
|---|---|
| *F02M 26/35* | (2016.01) |
| *F02M 26/43* | (2016.01) |
| *F02M 26/05* | (2016.01) |
| *F01N 3/02* | (2006.01) |
| *F02M 26/36* | (2016.01) |
| *F01N 5/02* | (2006.01) |
| *F02M 26/06* | (2016.01) |

(52) U.S. Cl.
CPC ............ *F02M 26/35* (2016.02); *F01N 3/0205* (2013.01); *F01N 5/02* (2013.01); *F02M 26/05* (2016.02); *F02M 26/06* (2016.02); *F02M 26/36* (2016.02); *F02M 26/43* (2016.02)

(58) Field of Classification Search
CPC ........ F02M 26/35; F02M 26/05; F02M 26/06; F02M 26/36; F02M 26/43; F01N 3/0205; F01N 5/02
USPC ..................................................... 123/568.14
See application file for complete search history.

(56) References Cited

U.S. PATENT DOCUMENTS

| | | | | |
|---|---|---|---|---|
| 10,119,500 | B2 * | 11/2018 | Henry | F02M 26/35 |
| 2006/0174608 | A1 * | 8/2006 | Hu | B01D 53/90 |
| | | | | 60/286 |
| 2007/0190377 | A1 * | 8/2007 | Elwart | H01M 8/04373 |
| | | | | 429/416 |
| 2007/0243127 | A1 * | 10/2007 | Fedorov | B01D 61/00 |
| | | | | 423/648.1 |

(Continued)

FOREIGN PATENT DOCUMENTS

JP            2008223537 A  *  9/2008  ............. F28F 3/025

*Primary Examiner* — Mahmoud Gimie
(74) *Attorney, Agent, or Firm* — Livingston Law Firm (57) ABSTRACT

A method of providing electrical power to on-board electrical devices of a vehicle. The engine has an EGR (exhaust gas recirculation loop) which may be a high pressure loop, a low pressure loop, or a dedicated cylinder loop. A catalyzed heat exchanger on the EGR loop has a steam reformation catalyst and a heat exchanger. The heat exchanger uses hot exhaust gas from the main exhaust line to heat the catalyst. A methane fuel source adds methane to the recirculated exhaust stream before it enters the catalyst, and the catalytic reaction increases the amount of hydrogen in the recirculated exhaust. The hydrogen is then delivered to a PEM fuel cell.

13 Claims, 5 Drawing Sheets

(56) References Cited

U.S. PATENT DOCUMENTS

| | | | |
|---|---|---|---|
| 2010/0212611 A1* | 8/2010 | Yahagi | F02M 26/15 |
| | | | 123/3 |
| 2010/0224141 A1* | 9/2010 | Nakada | F02D 19/0631 |
| | | | 123/3 |
| 2010/0300382 A1* | 12/2010 | Yahagi | C01B 3/323 |
| | | | 123/3 |
| 2013/0239547 A1* | 9/2013 | Gingrich | F01N 3/101 |
| | | | 60/274 |
| 2014/0196702 A1* | 7/2014 | Gingrich | F02D 41/0065 |
| | | | 123/568.21 |
| 2014/0260242 A1* | 9/2014 | Chadwell | F02B 37/12 |
| | | | 60/605.1 |
| 2014/0360461 A1* | 12/2014 | Ulrey | F02M 26/43 |
| | | | 123/299 |
| 2016/0131056 A1* | 5/2016 | Henry | F02D 41/0082 |
| | | | 60/274 |
| 2016/0169186 A1* | 6/2016 | Stroh | F02P 5/1516 |
| | | | 123/406.48 |

* cited by examiner

INTERNAL COMBUSTION ENGINE HAVING CATALYZED HEAT EXCHANGER FOR STEAM REFORMATION AND DELIVERY OF HYDROGEN TO A FUEL CELL

TECHNICAL FIELD OF THE INVENTION

This invention relates to internal combustion engines with exhaust gas recirculation, and more particularly to using exhaust as a hydrogen source for a fuel cell.

BACKGROUND OF THE INVENTION

Various efforts have been made to recover waste heat in internal combustion engines. In general, "waste heat recovery" refers to using thermal energy from process outputs at high temperature to power some other device.

In transportation applications, exhaust heat recovery systems turn thermal losses in the exhaust pipe into energy. This technology is of increasing interest as an efficient way to save fuel and reduce emissions. This technology can be used either on a hybrid vehicle or a conventional one: it produces either electric energy for batteries or mechanical energy reintroduced on the crankshaft.

There have been a multitude of waste heat capture devices. Conventional waste heat recuperative devices are complex thermal systems that use a separate working fluid and turbine system, which is mechanically coupled to the engine system. This type of system has been shown to provide fuel efficiency improvements, but at a cost higher than the market will bear.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

U.S. Pat. No. 10,119,500 to C. Henry, entitled "Internal Combustion Engine Having Exhaust Gas Recirculation Loop with Catalyzed Heat Exchanger for Steam Reformation", describes various EGR (exhaust gas recirculation) engines having a steam reforming catalyst with a built-in heat exchanger (referred to herein as a "catalyzed heat exchanger" placed on the EGR loop. The heat exchanger is used to enhance the amount of hydrogen and carbon monoxide in the recirculated exhaust. That patent is incorporated herein by reference.

A feature of the invention described herein is the recognition that the same catalyzed heat exchanger can also provide a hydrogen source for a PEM (proton exchange membrane) fuel cell. This fuel cell application of the catalyzed heat exchanger may be implemented with any engine. Specifically, the catalyzed heat exchanger may be installed on an EGR loop of an EGR engine or installed on the main exhaust line of an engine not having EGR.

Catalyzed Heat Exchanger and Fuel Cell with Dedicated EGR

Figure 1:
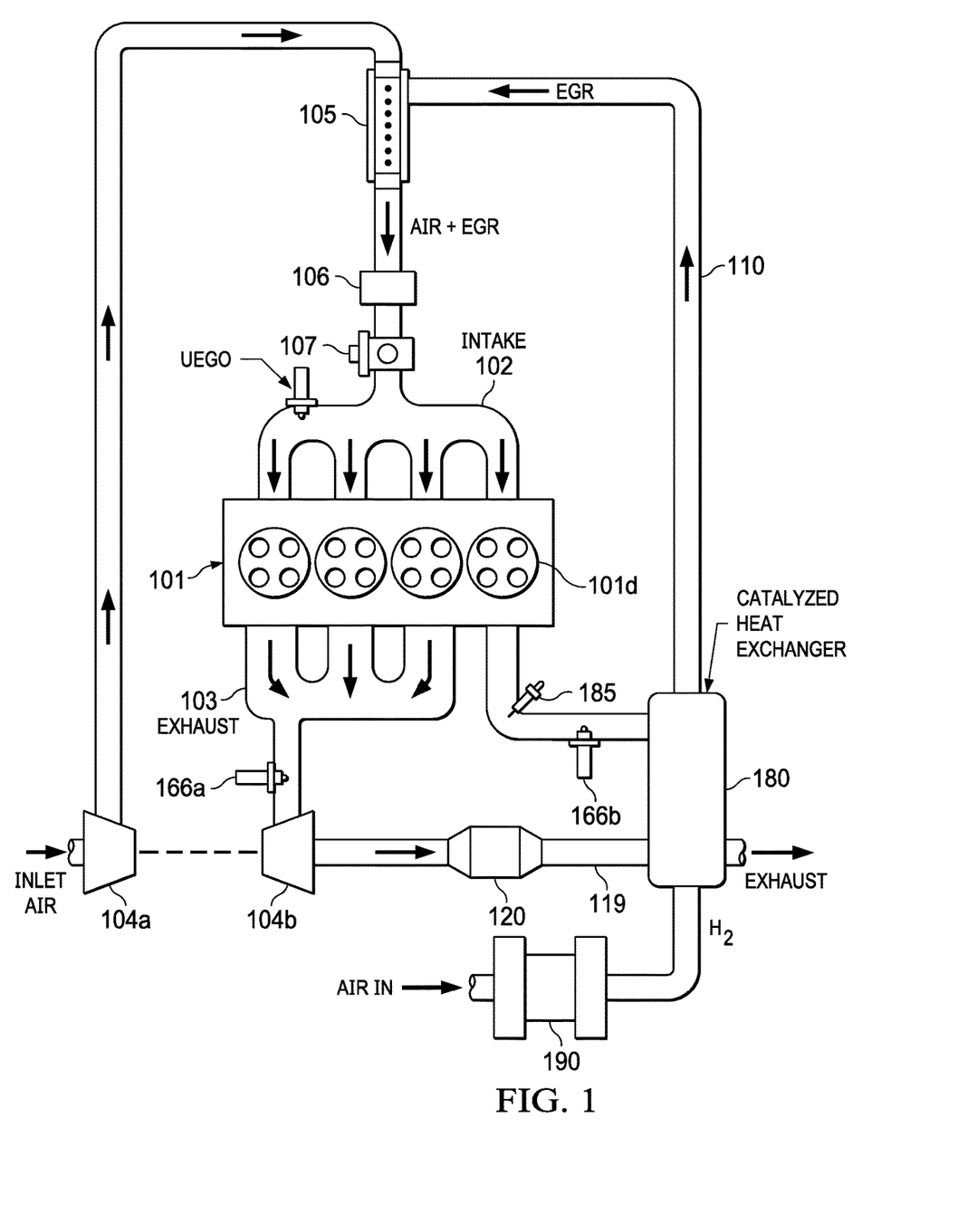
FIG. 1 illustrates an example of an internal combustion engine having a dedicated EGR cylinder, steam reformation catalyst, and PEM fuel cell in accordance with the invention.

FIG. 1 illustrates an internal combustion engine 100 having four cylinders 101. One of the cylinders is a dedicated EGR cylinder, identified as cylinder 101d. Cylinder 101d has an exhaust port that opens only to an EGR loop 110. The other cylinders 101 produce exhaust that exits the engine via the main exhaust line 119 and one or more exhaust aftertreatment devices 120.

In the example of this description, engine 100 is spark-ignited, with each cylinder 101 having an associated spark plug, and its "normal" air-fuel ratio (that of the cylinders 101 other than the dedicated EGR cylinder 101d) is stoichiometric. Engine 100 may use various types of fuels, such as gasoline, and the invention described herein is particularly useful with natural gas fueled engines.

A feature of dedicated EGR is that the composition of the dedicated EGR exhaust gas may be controlled to be different from that of the exhaust of the non-dedicated cylinders. For example, the dedicated EGR cylinder 101d may be operated rich of stoichiometric to provide EGR that improves combustion on all cylinders. Thus, in a dedicated EGR engine, the dedicated and non dedicated cylinders may receive different amounts of fuel. This is in contrast to a conventional engine, in which the cylinders are typically fueled such that all cylinders receive the same amount of fuel.

If a dedicated EGR cylinder is run rich of stoichiometric A/F ratio, a significant amount of hydrogen ($H_2$) and carbon monoxide (CO) may be formed in the exhaust gas of the dedicated EGR cylinder. The benefits of $H_2$ (for both increased knock and EGR tolerance) are greater than the benefits of CO. Thus, it is desired to produce more $H_2$ than CO.

The dedicated EGR cylinder 101d has all of its exhaust recirculated back to the intake manifold 102. The exhaust of the other three cylinders 101 (referred to herein as the "main" or "non dedicated" cylinders) is directed to the main exhaust line 119 via an exhaust manifold 103.

Engine 100 is equipped with a turbocharger, comprising a compressor 104a and a turbine 104b. Although not explicitly shown, all cylinders 101 have some sort of fuel delivery system for introducing fuel into the cylinders. This fuel delivery system can be fumigated, port injected, or direct injected.

The EGR loop 110 joins the intake line downstream the compressor 104a. A mixer 105 mixes the EGR and fresh air, and a cooler 106 reduces the temperature of the intake charge. A throttle 107 controls the amount of intake (fresh air and EGR) into the intake manifold 102. Various means, such as variable valve timing, valves, etc. (not shown), may be used to control EGR flow.

The "EGR fraction" in the example of FIG. 1 is 25%, with one of four cylinders 101 being a dedicated EGR cylinder. In other embodiments, there may be a different number of engine cylinders, and/or there may be more than one dedicated EGR cylinder. In general, in a dedicated EGR engine configuration, the exhaust of a sub-group of cylinders is routed back to the intake of all the cylinders, thereby providing EGR for all cylinders.

After entering the cylinders 101, the fresh-air/EGR mixture is ignited and combusts. After combustion, exhaust gas from each main cylinder 101 flows through its exhaust port and into exhaust manifold 103. From the exhaust manifold 103, exhaust gas then flows through turbine 104b, which drives compressor 104a.

After turbine 104b, exhaust gas flows to an exhaust aftertreatment device 120 via the main exhaust line 119, to be treated before exiting to the atmosphere. Because only stoichiometric exhaust leaves the engine, the exhaust aftertreatment device 120 may be a three-way catalyst.

To control the air-fuel ratio, exhaust gas may be sampled by an exhaust gas oxygen (EGO) sensor. Both the main exhaust line 119 and the EGR loop 110 may have a sensor (identified as 166a and 166b).

An EGR control unit (not shown) has appropriate hardware (processing and memory devices) and programming for performing the methods described herein. In addition, the control unit may perform other tasks, such as overall EGR control, and may be integrated with a comprehensive engine control unit.

A catalyzed heat exchanger (reactor) 180 is catalyzed to act as a steam-methane reformation catalyst and is installed in-line on the EGR loop 110. As explained below, heat exchanger 180 uses exhaust from the main exhaust line 119 to raise the temperature of the EGR exhaust and to produce hydrogen ($H_2$) and carbon monoxide (CO).

A fuel injector 185 injects a methane source, such as natural gas or other hydrocarbon fuel, into the EGR stream upstream of catalyzed heat exchanger 180. In theory, any hydrocarbon fuel may be steam reformed. Specific examples are gasoline, diesel, methane, propane, and ethanol.

Fuel injector 185 is located downstream of the EGR take-off point from dedicated EGR cylinder 101d, and upstream of catalyzed heat exchanger 180.

If engine 100 is fueled by natural gas, the methane source may be from the same fuel reservoir as used for the engine. In engines fueled with fuels other than natural gas, the methane source may be stored in an on-board reservoir (not shown) separate from that of the engine fuel.

Steam reforming of natural gas, sometimes referred to as steam methane reforming, is conventionally used commercially to produce bulk hydrogen. At high temperatures (500-1100° C.) and in the presence of a metal-based catalyst, steam reacts with methane ($CH_4$) to yield carbon monoxide (CO) and hydrogen ($H_2$). Steam reformation catalysts are typically formulated with nickel as the active metal, although other active components may be utilized.

The steam reformation reaction is endothermic, meaning energy is consumed during the reaction. Heat must be supplied to the process for the reaction to proceed.

The lower heating value (or energy content) of the formed $H_2$ and CO mixture is greater than the lower heating value of the consumed $CH_4$. This allows for conversion of thermal energy to chemical energy in the form of $H_2$ and CO, as shown in the following equation.

$$CH_4(g)+H_2O(v) \leftarrow CO+3H_2$$

As stated above, for purposes of recirculated exhaust, the benefits of $H_2$ are greater than the benefits of CO. Therefore, it would be desired for catalyzed heat exchanger 180 to produce more $H_2$ than CO. The relative production of $H_2$ and CO is pre-determined by the H:C ratio of the fuel used in the reforming process. Also, more $H_2$ and CO can be generated using the steam reforming reaction if more thermal energy is available to drive the reactor.

To this end, catalyzed heat exchanger 180 is configured to transfer thermal energy from the main exhaust stream to the EGR stream. In other words, catalyzer heat exchanger 180 is a combined catalyst/heat exchanger system. For the four-cylinder dedicated EGR engine of FIG. 1, catalyzed heat exchanger 180 has the potential to increase the thermal energy of the EGR stream by up to a factor of three.

In one embodiment, catalyzed heat exchanger 180 comprises a high temperature heat exchanger, which is coated with a catalyst material for the steam reforming reaction. The main exhaust stream from main exhaust line 119 is used to keep the surface of the catalyst material at the same temperature as the main exhaust stream. The surface temperature of the catalyst controls the chemical reaction rates, with the exhaust from exhaust manifold 103 maintaining a constant catalyst surface temperature leading to a high yield of $H_2$ and CO.

Figure 2:
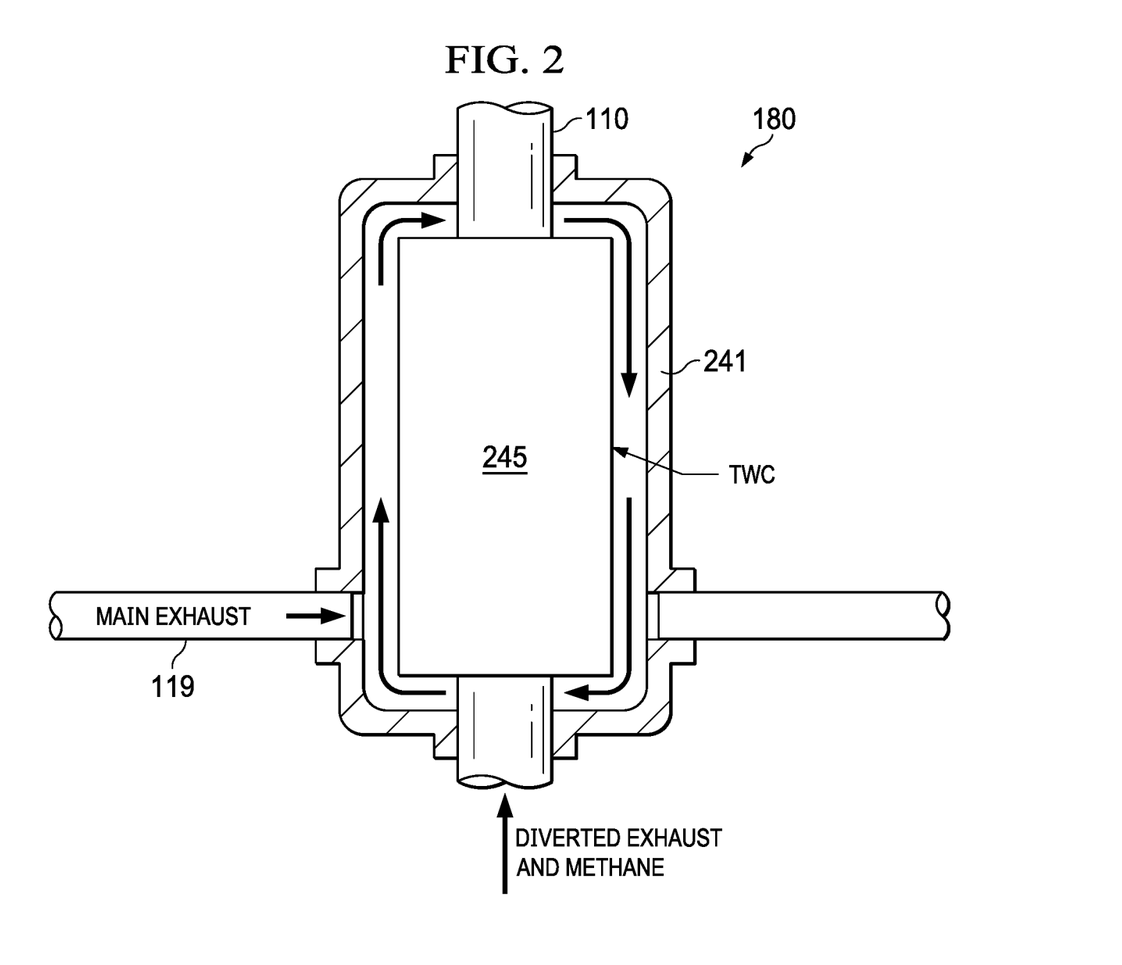
FIG. 2 illustrates a catalyzed heat exchanger in accordance with the invention.

FIG. 2 is a cross-sectional view of an example of a catalyzed steam reformer 180. A housing 241 contains both a heat exchanger 243 and a catalyzed reactor 245. In the example of FIG. 2, exhaust from the main exhaust line 119 enters an outer heat exchanger jacket 241 and circulates around the surface of catalyst reactor 245. The heat exchanger jacket 241 transfers thermal energy from the main exhaust stream to the EGR stream as thermal energy is converted in the EGR stream via the steam reforming reaction. This heat exchange maintains high catalyst surface temperature in the EGR stream as the EGR stream flows through the catalyzed reactor 245 and during the steam reforming reaction.

Catalyst 245 may be implemented with catalyzed pellets, honeycomb surfaces, or any other configuration used for catalytically treating exhaust gas. Catalyst 245 may be a membrane reactor or packed-bed reactor.

As stated above, various catalytic materials may be used to coat the catalyst surfaces or to coat the surface of the heat exchanger, for purposes of the steam reformation reaction. Specific examples of catalyst materials are nickel, platinum, palladium, and rhodium. Catalyst supports can include cerium oxide, aluminum oxide, and silicon oxide.

Many other configurations for circulating exhaust from the main exhaust line 119 within catalyzed heat exchanger 180 are possible. A multiplicity of straight tubes or U-shaped tubes or coils could be used. These various configurations could be used to heat the internal portions of reactor 245 and not simply its outer surface. As stated above, the catalyst material could be used as a coating on the heat exchanger tubing.

To take advantage of the exotherm generated in the portions of the heat exchanger exposed to the main exhaust stream, those portions can be coated with three-way catalyst material.

Referring again to FIG. 1, all or a portion of the $H_2$ produced by catalyzed heat exchanger 180 is delivered to a proton-exchange membrane (PEM) fuel cell 190. PEM's are a type of fuel cell, one of whose distinguishing features is a special proton-conducting polymer electrolyte membrane. PEM's generate electricity and operate on the opposite principle to PEM electrolysis, which consumes electricity.

The PEM fuel cell 190 transforms chemical energy liberated during an electrochemical reaction of hydrogen and oxygen to electrical energy. For this reaction to occur, a stream of hydrogen (the "fuel") is delivered to an anode side of the PEM fuel cell 190.

PEM fuel cell 190 may be used to power various electrical devices on-board the vehicle. A particular use of the PEM fuel cell 190 could be to charge an on-board battery system of a hybrid combustion-electric vehicle.

If desired, all or some (perhaps varying with engine operating conditions) of the $H_2$/CO product of the heat exchanger 180 may be routed to the EGR loop instead of or in addition to being routed to the fuel cell 190.

Further, if desired, catalyzed heat exchanger may be equipped with a hydrogen selective membrane for $H_2$ purification.

The exhaust in the main exhaust line 119 is treated with a three-way catalyst (TWC) or other exhaust aftertreatment device 120. The placement of the catalyzed heat exchanger 180 may be downstream the TWC 120, such as when a significant exotherm is generated across the TWC 120. In other embodiments the catalyzed heat exchanger 180 may be positioned upstream of the TWC 120, close to the engine so that the EGR gas temperature is maintained as high as possible. In other words, the placement of the catalyzed heat exchanger 180 may depend on the design of a particular engine.

Catalyzed Heat Exchanger and Fuel Cell with HPL EGR

Figure 3:
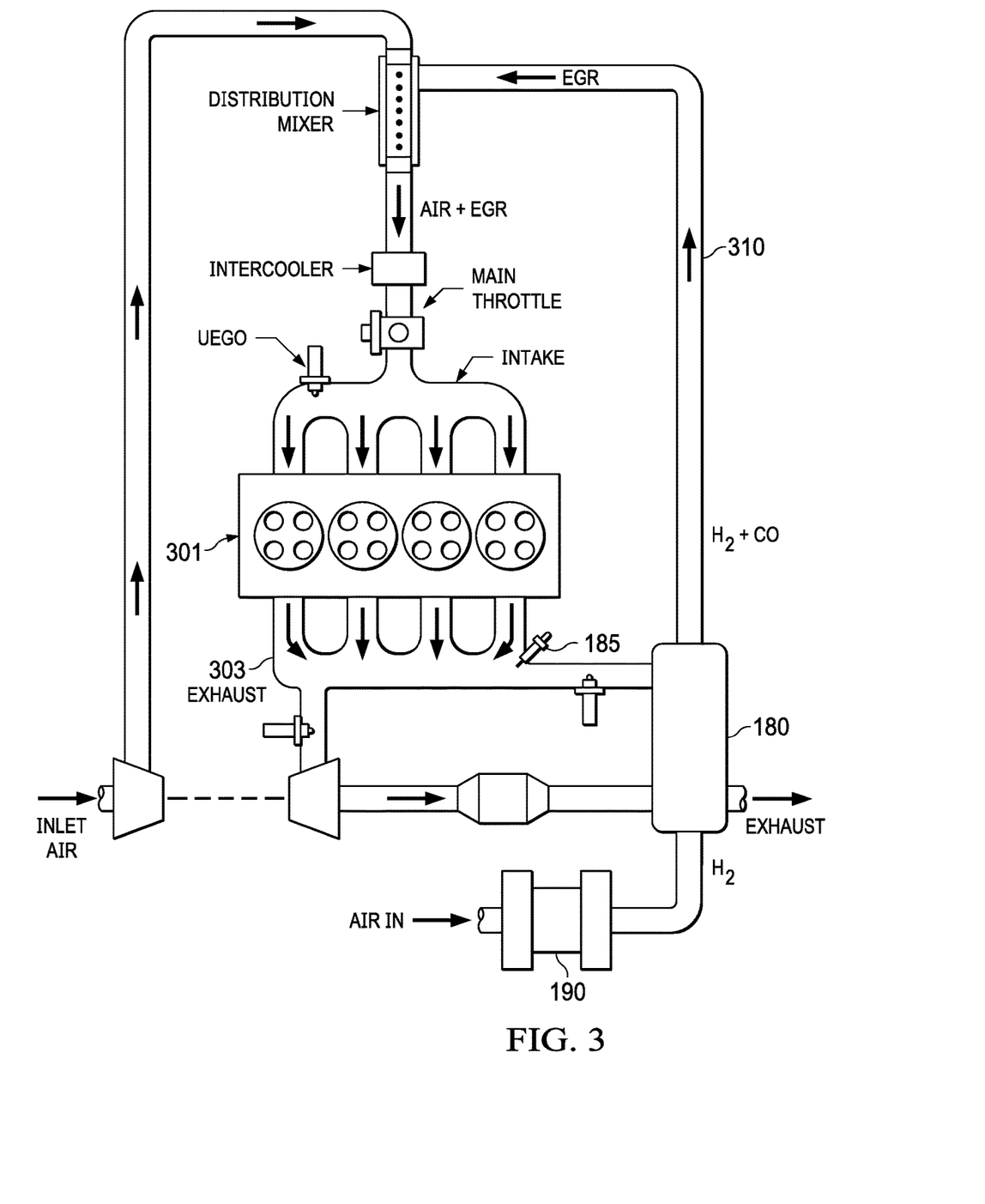
FIG. 3 illustrates an example of an internal combustion engine having a high pressure loop for EGR, a steam reformation catalyst, and a fuel cell in accordance with the invention.

FIG. 3 illustrates an engine 300 having a high pressure EGR loop, in which all cylinders 301 contribute to the EGR flow. In other words, engine 300 does not use dedicated EGR. The "take-off" point for the EGR loop 310 is from the exhaust manifold 303. In other respects, engine 300 is similar to engine 200.

Engine 300 has a catalyzed heat exchanger 180, which may be configured as shown in FIG. 2 or may have other of the above-described configurations. A fuel injector 185 provides hydrocarbon fuel for the steam reformation.

Catalyzed Heat Exchanger and Fuel Cell with LPL EGR

Figure 4:
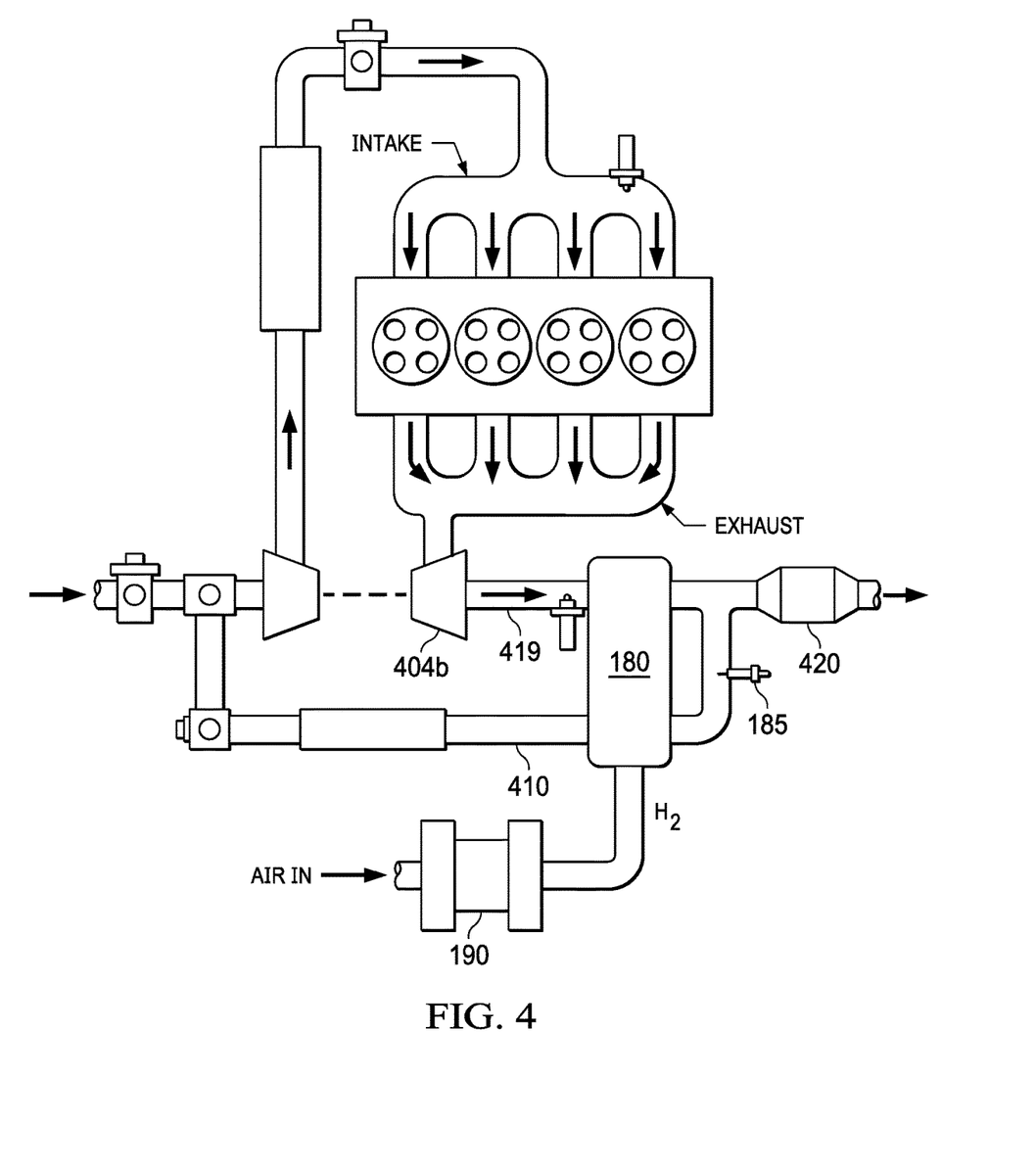
FIG. 4 illustrates an example of an internal combustion engine having a low pressure loop for EGR, a steam reformation catalyst, and a fuel cell in accordance with the invention.

FIG. 4 illustrates an engine 400 having a low pressure EGR loop and non-dedicated EGR. In this EGR configuration, the "take-off" point for the EGR loop 410 is from the main exhaust line 419, downstream of turbine 404*b*, but upstream aftertreatment device 420. In other respects, engine 400 is similar to engines 200 and 300.

Engine 400 has a catalyzed heat exchanger 180, which may be configured as shown in FIG. 2 or may have other of the above-described configurations. A fuel injector 185 provides hydrocarbon fuel for the steam reformation.

Catalyzed Heat Exchanger and Fuel Cell without EGR

Figure 5:
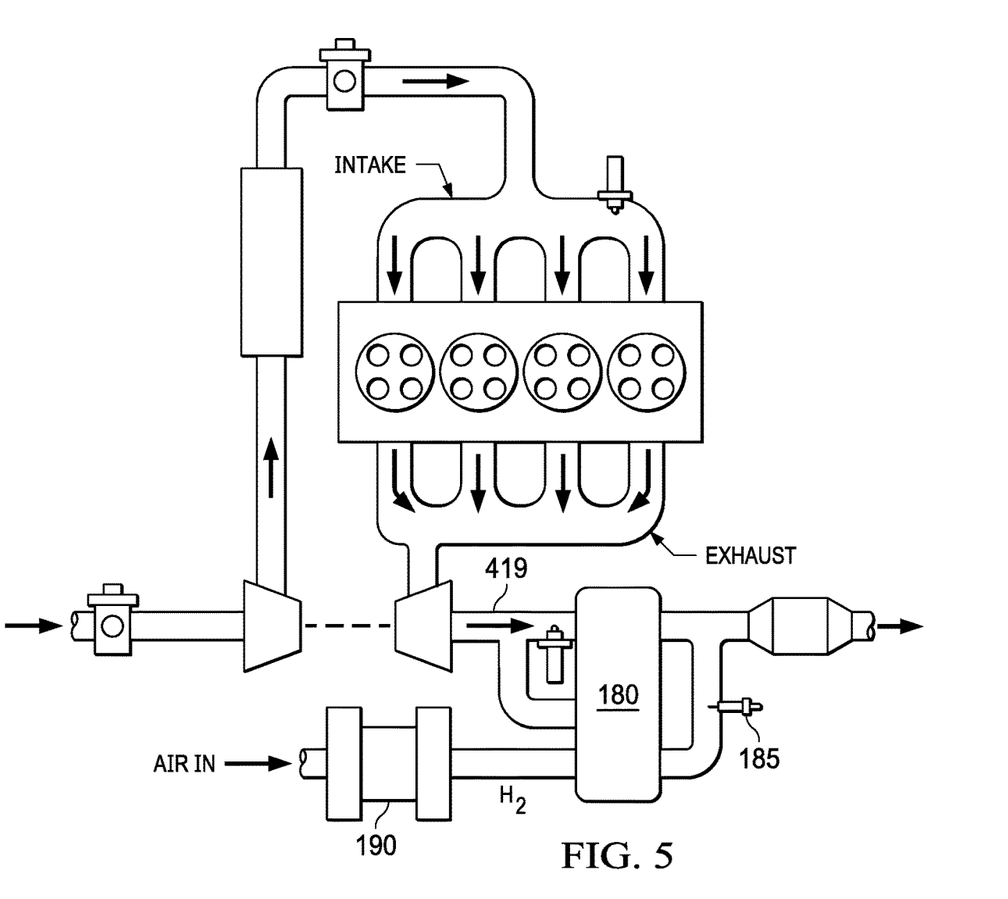
FIG. 5 illustrates an example of an internal combustion engine which recirculates exhaust for use by a steam reformation catalyst, which provides hydrogen for a fuel cell in accordance with the invention.

As indicated in FIG. 5, the above-described combination of a catalyzed heat exchanger 180 and a fuel cell 190 is useful in engines not having EGR back to the cylinders. That is, a portion of the engine exhaust is diverted from the main exhaust line to a "recirculation loop" on which the heat exchanger 180 is installed.

This diverted exhaust is used by the heat exchanger 180 to produce hydrogen for fuel cell 190. Any unused exhaust is "recirculated" back to the main exhaust line rather than back to the engine intake.

What is claimed is:

1. A method of providing electrical power to battery operated on- board electrical devices of a vehicle having an internal combustion engine having a number of cylinders, the cylinders receiving an intake charge via an intake line, and the cylinders emitting exhaust via a main exhaust line, comprising:
   providing an exhaust gas recirculation (EGR) loop to route recirculated exhaust from at least one cylinder to a point on the intake line;
   installing a catalyzed heat exchanger on the EGR loop;
   wherein the catalyzed heat exchanger has a catalyst reactor and a heat exchanger;
   wherein the catalyst reactor is operable to perform a steam reformation process;
   installing a fuel injector on the EGR loop upstream of the catalyzed heat exchanger;
   receiving a hydrocarbon fuel via the fuel injector into the EGR loop, such that the recirculated exhaust and the hydrocarbon fuel form a mixture of fuel for a reforming process;
   receiving exhaust from the main exhaust line into the heat exchanger and using the exhaust from the main exhaust line to heat the catalyst reactor; and
   using the catalyzed reactor to increase the amount of hydrogen in the recirculated exhaust;
   wherein the ratio of hydrogen to carbon in the mixture of fuel for the reforming process is predetermined to preferentially result in hydrogen rather than carbon monoxide as a product of the reforming process; and
   delivering at least a portion of the recirculated exhaust to a PEM (proton exchange membrane) fuel cell.

2. The method of claim 1, wherein the engine has at least one cylinder that is a dedicated EGR cylinder and wherein the EGR loop receives exhaust from the dedicated EGR cylinder.

3. The method of claim 1, wherein the EGR loop is a low pressure EGR loop.

4. The method of claim 1, wherein the EGR loop is a high pressure EGR loop.

5. The method of claim 1, wherein the hydrocarbon fuel is gasoline, diesel, methane, propane, or ethanol.

6. The method of claim 1, wherein the hydrocarbon fuel is delivered from the same fuel reservoir as the used for the engine.

7. The method of claim 1, wherein the catalyst reactor is a hydrogen selective membrane reactor.

8. The method of claim 1, wherein the catalyst has catalyst material comprising nickel, platinum, palladium, or rhodium.

9. The method of claim 1, wherein the engine has an exhaust aftertreatment device, and the catalyzed heat exchanger receives exhaust downstream of the aftertreatment device.

10. The method of claim 1, wherein the engine has an exhaust aftertreatment device, and the catalyzed heat exchanger receives exhaust upstream of the aftertreatment device.

11. The method of claim 1, wherein portions of the heat exchanger exposed to the main exhaust stream are coated with three-way catalyst material.

12. A method of providing electrical power to battery operated on- board electrical devices of a vehicle having an internal combustion engine having a number of cylinders, the cylinders receiving an intake charge via an intake line, and the cylinders emitting exhaust via a main exhaust line, comprising:
   diverting a portion of the exhaust to a recirculation loop that returns the exhaust to the main exhaust line;
   installing a catalyzed heat exchanger on the recirculation loop;
   wherein the catalyzed heat exchanger has a catalyst reactor and a heat exchanger;
   wherein the catalyst reactor is operable to perform a steam reformation process;
   installing a fuel injector on the recirculation loop upstream of the catalyzed heat exchanger;

receiving a hydrocarbon fuel via the fuel injector into the recirculation loop, such that the recirculated exhaust and the hydrocarbon fuel form a mixture of fuel for a reforming process;

receiving exhaust from the main exhaust line into the heat exchanger and using the exhaust from the main exhaust line to heat the catalyst reactor; and using the catalyzed reactor to increase the amount of hydrogen in the recirculated exhaust;

wherein the ratio of hydrogen to carbon in the mixture of fuel for the reforming process is predetermined to preferentially result in hydrogen rather than carbon monoxide as a product of the reforming process; and delivering at least a portion of the recirculated exhaust to a PEM (proton exchange membrane) fuel cell.

13. The method of claim 12, wherein portions of the heat exchanger exposed to the main exhaust stream are coated with three-way catalyst material.

* * * * *